United States Patent [19]

de Kermadec et al.

[11] 3,952,122

[45] Apr. 20, 1976

[54] PRINTING PAPER WITH A LEADER ELEMENT ATTACHED TO THE END THEREOF

[75] Inventors: Alain de Kermadec, Versailles; Paul Vilella, Bruyeres-le-Chatel, both of France

[73] Assignee: Compagnie Industrielle des Telecommunications Cit-Alcatel, France

[22] Filed: May 21, 1974

[21] Appl. No.: 471,884

[30] Foreign Application Priority Data

May 21, 1973 France ............................ 73.18342

[52] U.S. Cl. .................................... 428/77; 101/93; 197/133 R; 197/135 R; 428/81

[51] Int. Cl.$^{2}$ ....................... B32B 3/02; B41J 15/04

[58] Field of Search ........................ 161/39, 145, 44; 197/135 R, 133 R, 133 P, 133 T; 101/93; 428/77, 81

[56] References Cited

UNITED STATES PATENTS

| | | | |
|---|---|---|---|
| 1,407,440 | 2/1922 | Reddick | 197/135 R |
| 1,614,599 | 1/1927 | Bryant | 197/135 R |
| 2,188,347 | 1/1940 | Fulk | 197/133 R |
| 2,539,718 | 1/1951 | Balzak | 197/135 R |
| 3,356,201 | 12/1967 | Fleischmann | 197/135 R |

*Primary Examiner*—Philip Dier

*Attorney, Agent, or Firm*—Craig & Antonelli

[57] ABSTRACT

The present invention has for its object a device for loading paper in a printing machine. The printing paper formed by a strip of white paper and a strip of carbon paper wound together bears a lead-in end made of thin cardboard, preferentially having the shape of a trapezium, or trapezoid whose small base is stuck to the white paper and whose large base is stuck to the carbon paper for the easy insertion of that double paper in the machine, whereas the support of the roll of double paper is mounted in a tilting position on the machine for the loading of the roll of paper.

5 Claims, 5 Drawing Figures

PRINTING PAPER WITH A LEADER ELEMENT ATTACHED TO THE END THEREOF

The present invention relates to the loading of paper on a hammer-stroke printing machine. It relates more particularly to machines in which the paper to be printed must be guided along a path having multiple changes in direction, for example along one or several rolls limiting a paper insertion trough. The machines may, more particularly, be machines for recopying documents. Such printing paper is double, and it consists of the superimposing of a strip of white paper on a strip of carbon paper rolled together to form a roll of printing paper.

During the insertion of the end of that roll of printing paper in a machine, folds of the edges of the strips of which it is constituted, jamming and/or tearing of one or the other or both of the strips are formed if that insertion is not effected with great care and with suitable means. The result of this is long and inconvenient handling operations.

The aim of the present invention is to obviate these disadvantages by a conditioning of that printing paper.

Moreover, the present invention also has for its aim, with a view to enabling easy loading of the printing paper on the machine, a contrivance of means for loading printing paper co-operating with the paper conditioning means for making the installing of the printing paper on the machine easier.

The present invention has for its object a device for loading paper for a printing machine, constituted by the superimposing of a strip of white paper on a strip of carbon paper, that printing paper being characterized in that a first end of these two superimposed strips is provided with a leader fastened with the respective strips, having sufficient stiffness while enabling it to be curved to ensure the guiding of the printing paper along a path of insertion of the paper into the hammer-stroke printing machine.

The leader is, for example, made of cardboard and has a substantially trapezoidal shape. It is fastened, in the vicinity of its small base forming the insertion end of the leader, with the strip of white paper and, in the vicinity of its large base, with the strip of carbon paper, the intermediate part of the leader being free in relation to these strips of white paper and of carbon paper.

According to the present invention also, the device for loading a machine having a paper take-up drum and a striker element at a slight distance from the drum, is characterized in that a pay-out spool support consists of two aligned sections of shafts, fitting firmly against the inside surface of a mandrel of the pay-out spool and borne by two parallel flanges which may tilt on the stand of the machine, at least one of the said two shafts being able to be moved in the direction of its axis.

Other characteristics and advantages of the present invention will become apparent from the description of an embodiment given hereinafter with reference to the accompanying drawing, in which:

FIGS. 1*a* and 1*b* show the double printing paper conditioned according to the invention.

Figure 1A:
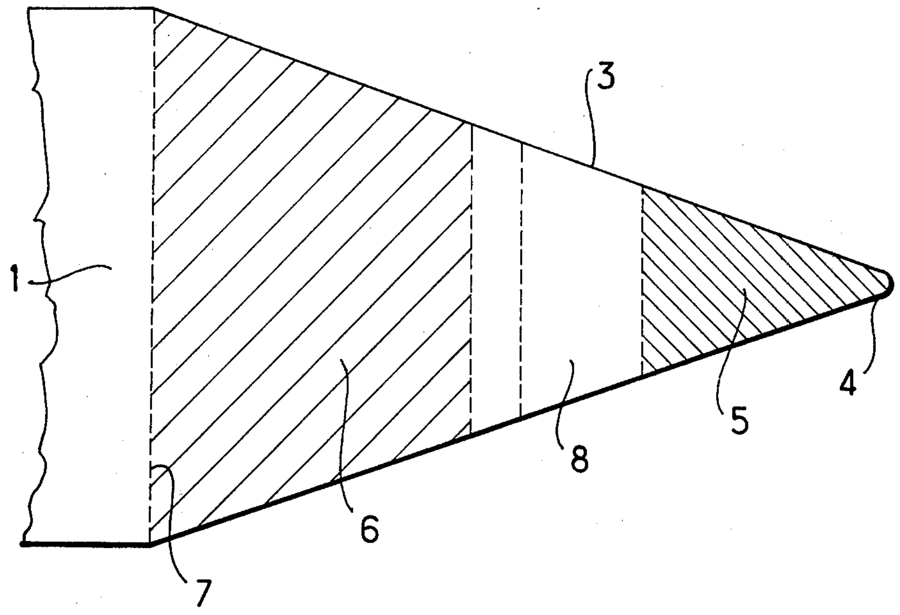
Figure 1B:
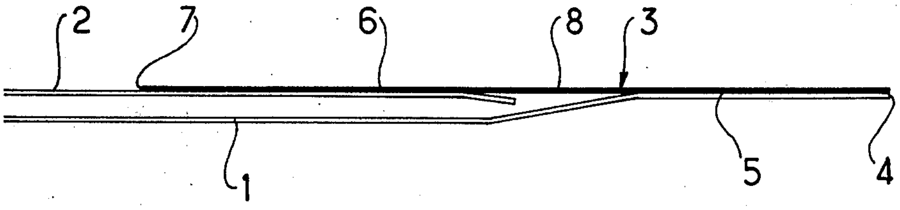

FIGS. 1*a* and 1*b* show a printing paper conditioned according to the invention enabling the easy inserting of the latter between the printing devices of a machine. Such printing paper is double. It consists of a strip of white paper 1 and a strip of carbon paper 2 set one against the other; these strips will be, for example, rolled together to form a roll of printing paper to be installed on a hammer-stroke printing machine. The end of that printing paper intended to be inserted in a machine is provided with a leader 3, for example made of cardboard. That leader will be chosen sufficiently stiff to ensure the inserting of the paper along a passage for inserting paper in a machine and sufficiently resilient to be curved and to guide the printing paper along the path of the passage, such as passage possibly being, at least partly, limited by the contour of one or several rolls or guides curved according to that contour.

The leader 3 has a trapezoidal shape, with a small base 4, having a slight dimension forming, to great advantage, a rounded insertion end. That leader is fastened, by cementing, in all the shaded zone 5, in the vicinity of its small base 4, with the strip of white paper 1; it is fastened, by cementing, in all its shaded zone 6, in the vicinity of its large base 7, with the strip of carbon paper 2, whose carboned side is covered by the strip of white paper 1. The intermediate zone 8 of the leader 3 is free in relation to the strips 1 and 2; it is used for separating easily the strip of carbon paper from the strip of white paper after their insertion in the printing machine: only the white paper, or, preferably, the leader 3, will be cut in the zone 8, the leader 3 or the portion 6 of the leader 3 adhering to the carbon paper 2 still being used for guiding the strip of carbon paper.

Figure 2:
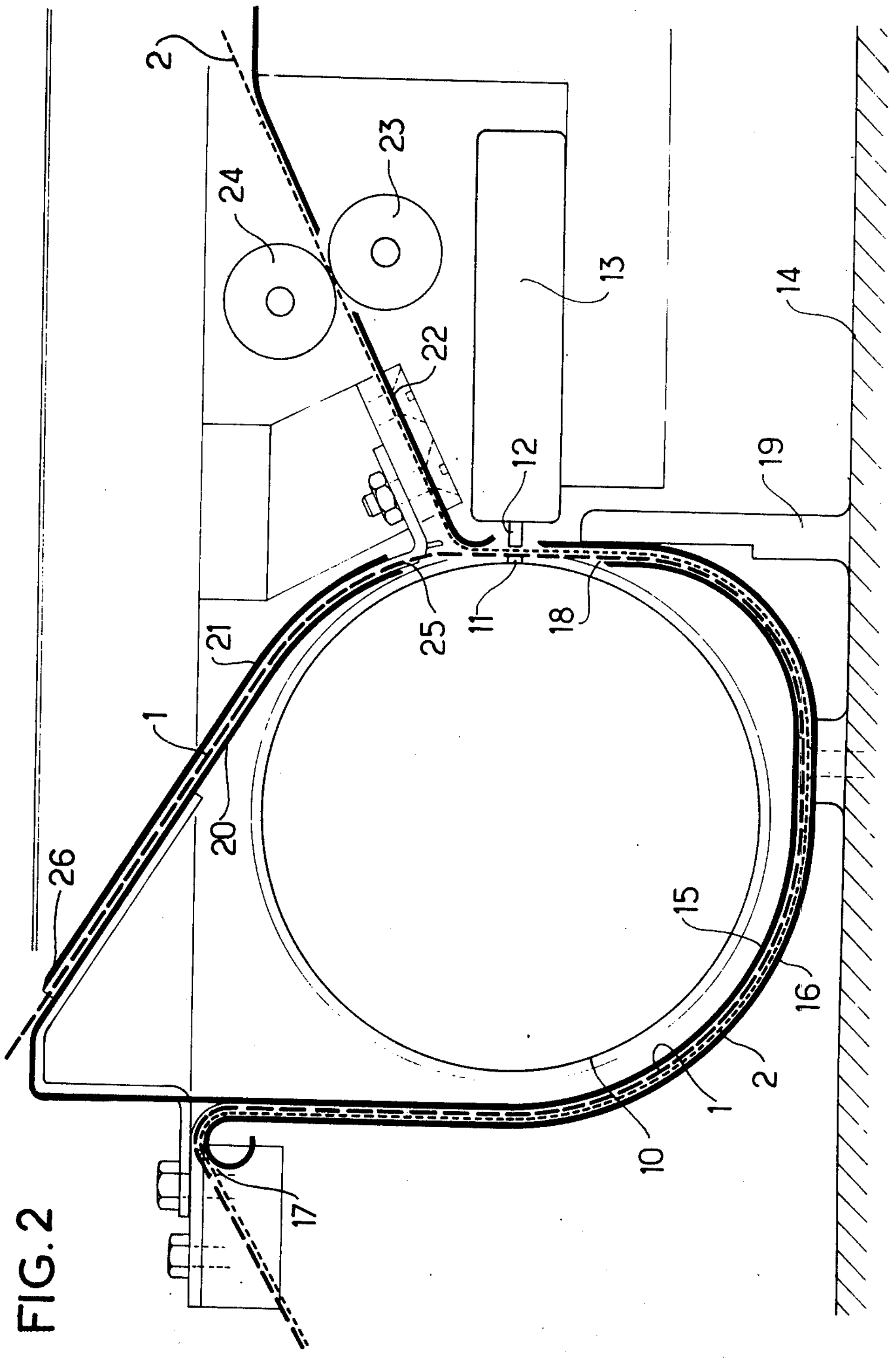
FIG. 2 shows diagrammatically a cutaway view of a machine for recopying documents by striking the double printing paper.

FIG. 2 shows a machine for recopying documents by printing on white paper connected with carbon paper. The machine as a whole is not shown; the main parts constituting it are shown and in a vertical cutaway view. That machine comprises a rotating drum 10 bearing, with great advantage, a protruding helix 11 on its periphery. That helix 11, having a wide pitch, forms a single loop. The composition of the rotating movement of the drum and of the pitch of the helix enables the obtaining of a linear impression on the printing paper. An impression or striker bar 12 having substantially the same length as the drum, is arranged facing the drum 10 and at a slight distance therefrom. The impression bar is brought towards the drum by an electromagnet 13, which is actuated by a means not shown, and may be a simple connection, ensuring the transmission of data coming from an outside reading and coding device for data contained in a document to be reproduced, that reading and that coding possibly being effected at a distance. The component parts of the machine are supported by support fastened with a stand 14.

Two curved guides 15 and 16 at a slight distance from one another, limiting, between them, a passage for the printing paper 1 and 2, shown by discontinuous lines (white paper 1 and carbon paper 2) are arranged on a part of the periphery of the drum 10, set slightly apart from the drum 10. These guides 15 and 16 extend substantially from the support of a double paper pay-out spool, not shown here, but arranged to the left of the ends of the guides 15 and 16 forming an insertion opening 17 for the paper, up to the level of the striker bar 12, where they form an output 18 for the two strips 1 and 2. Supports such as 19 maintain these guides 15 and 16. Upstream from that output 18, the guides 15 and 16 have an accentuated curve, in the direction of the drum 10, so that the printing paper may come normally into position, tangentially to the drum, against the drum, facing the striker bar 12.

Downstream from the striker bar 12, the machine comprises, moreover, two other guides 20 and 21 for the strip of white paper 1 only, these two guides limiting, between them, a path which is substantially tangential to the drum above the striker bar for the removal of the white printed paper and an extra guide part 22 for the removal, in another direction, of the strip of carbon paper 2. Two guide rolls 23 and 24, one of which, 23, for example, is driven in a rotating movement, installed after the guide part 22 of the strip of carbon paper 2 alone, clamp the strip of carbon slightly, pulling on that strip. These two rolls 23 and 24 thus make the roll of double paper pay-out.

The end 26 of the guide 21 forming the output of the white paper constitutes a knife for tearing the cardboard leader 3 connected with the double paper in its intermediate zone 8 (FIGS. 1*a* and 1*b*). For that purpose, at the time of placing the paper in the machine, the double paper 1 and 2 is originally inserted in the guides 15 and 16 then 20 and 21 until the leader comes out at the end 26 of the guide 21. The end of the leader is then grasped to be cut at that end 26. The strip of carbon paper is removed from the guides 20 and 21, the guide 21 having, to great advantage, for that purpose, an opening in its middle part and the strip of carbon paper is engaged on its guide 22 and between the pressing rolls 23 and 24, the portion of portion 6 (FIGS. 1*a* and 1*b*) still adhering to the carbon paper thus making that guiding easier.

It will be observed that the leader 3 will have, to great advantage, a length equal to the paths defined by the guides 15, 16 and 20, 21. The guides 15 and 16 and 20, 21 will have practically the same width as that of the double printing paper, that is, will extend substantially over the length of the drum 10.

Although not shown in FIG. 2, it will be easily understood that the profile of the guide 15, more particularly at the level of the output 18 may be determined so as to constitute a proper guiding of the double paper against the surface of the drum at the level of the striker bar. At the output 18, the middle part of that guide 15 is, for example, cut up as illustrated, to be recessed on the end of the connected guide 16; nevertheless, its longitudinal edges may be extended up to the end of the guide 16 to form, with it, guide grooves for the edges of the double printing paper.

Figure 3:
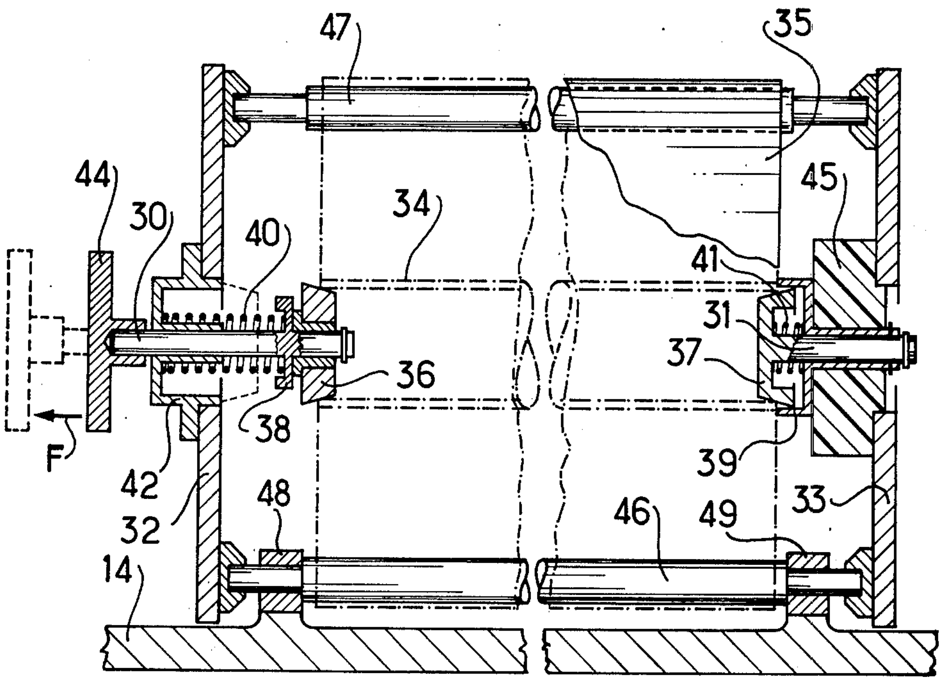
FIGS. 3 and 4 show the support for the printing paper of the machine according to FIG. 2.
Figure 4:
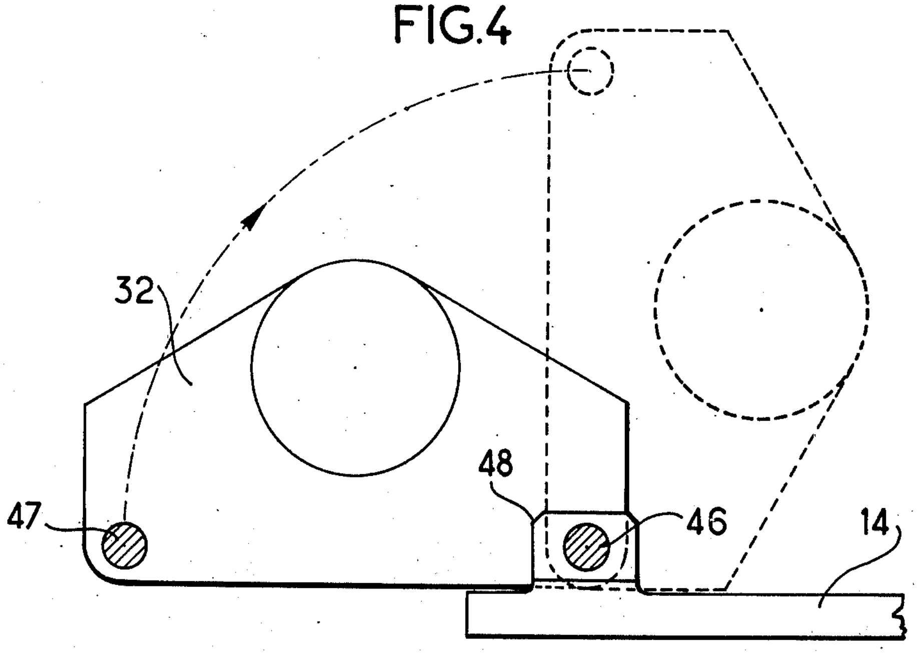

FIGS. 3 and 4 show the support of the pay-out spool for the paper of the machine, arranged to the left of the insertion opening 17 for the double printing paper to the guides 15 and 16 in FIG. 2. That support is constituted by two sections of shafts 30 and 31 mounted idle and aligned with each other on two vertical flanges 32 and 33 resting on the stand 14 of the machine. These two sections of shafts 30 and 31 are intended to have the ends of the mandrel 34 of a double roll of paper 35 fitted to it, being shown in discontinuous lines, to form the pay-out spool of the paper, engaging firmly against the inside surface of the mandrel. The ends facing the two shafts 30 and 31 bear or form two truncated cone shaped end pieces 36 and 37 which fit solidly against the inside surface of the mandrel 34. Each of these two shafts 30 and 31 also bears a part 38, 39 forming a cage, at the bottom of which an end of a spring 40, 41, surrounding each of the shafts, bears.

The spring 40 is mounted abutting between the cage 38 and a cage 42, facing the cage 38 but borne by a flange 32, that cage 42 being crossed by the shaft 30 whose end bears a prehension head 44. That spring is sufficiently long to enable, by its compression, to make it possible to actuate the shaft 30 in the direction of the arrow F in the direction of its axis as shown by discontinuous lines, in a recessed position. The spring 41 is mounted abutting against the cage 39 and the face facing the end piece 37 also profiled in the form of a cage to support the spring 41. Between the cage 39 and the flange 33, the shaft 31 bears an annular brake 45 made of plastic or rubber, ensuring a damping for sudden movements set up more particularly by the striker bar 12 (FIG. 2) when actuated.

In this assembly (FIG. 3), the parts rotating with the drum when the paper advances are the end piece 36 and the cages 39, 37 and the shaft 31, the end piece 36 forming an idle pulley on the shaft 30. It will be observed, moreover, that the cage 39 gives the plane of reference of the paper in relation to the striker bar 12 (FIG. 2).

Two eccentric rods 46 and 47 keep the flanges 32 and 33 one in relation to the other with a same gap. The lower rod 46, close to the stand 14, is mounted so as to move in rotation on that stand by means of the supports 48 and 49 through which it crosses. This assembly enables the easy tilting of the paper roll support assembly to make it engage easily, the weight of the paper roll being sufficient for keeping that support normally in the working position (non-tilted position).

The present invention has been described with reference to an example of embodiment. It is evident that it is possible, without going beyond the scope of the invention, to replace certain means by other technically equivalent means.

While we have shown and described several embodiments in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

We claim:

1. Device for loading paper in a printing machine comprising a leader, a strip of white paper having a first end fastened to a first portion of said leader, and a strip of carbon paper having a first end fastened to a second portion of said leader such that said strip of white paper is superimposed on said strip of carbon paper, wherein said leader includes a third intermediate portion separating said first and second portions of said leader.

2. Device for loading paper in a printing machine comprising a leader, a strip of white paper having a first end fastened to a first portion of said leader, and a strip of carbon paper having a first end fastened to a second portion of said leader such that said strip of white paper is superimposed on said strip of carbon paper, wherein said leader has a trapezoidal shape with said first portion of said leader being the small base of said trapezoidal shape and said second portion of said leader being the large base of said trapezoidal shape, and wherein said small base constitutes the free end of said leader.

3. Device for loading paper according to claim 2, wherein said leader includes a third intermediate portion separating said first and second portions of said leader.

4. Device for loading paper in a printing machine comprising a leader, a strip of white paper having a first end fastened to a first portion of said leader, and a strip of carbon paper having a first end fastened to a second portion of said leader such that said strip of white paper is superimposed on said strip of carbon paper, wherein said leader is of a material exhibiting stiffness but having resilience to be curved.

5. Device for loading paper according to claim 4, wherein said material is cardboard.

* * * * *